Nov. 24, 1953 — W. M. SMITH ET AL — 2,660,005
METHOD OF MAKING MERCURY COLUMN THERMOSTATS
Original Filed Feb. 17, 1949
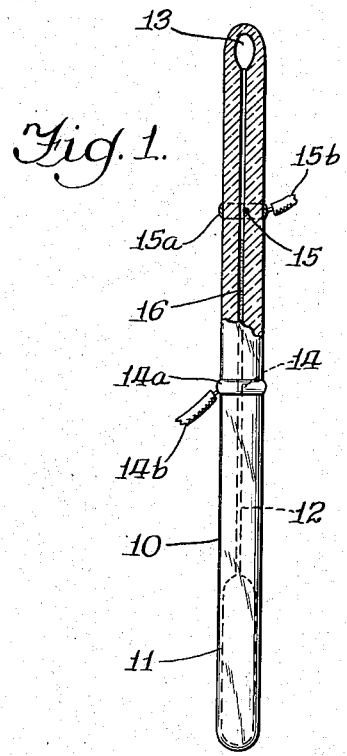
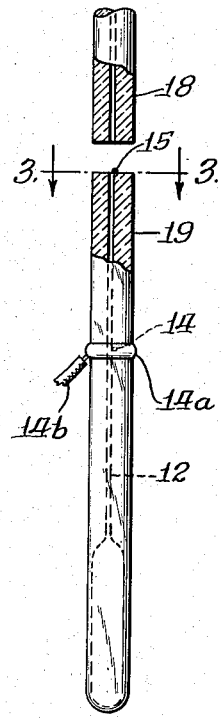
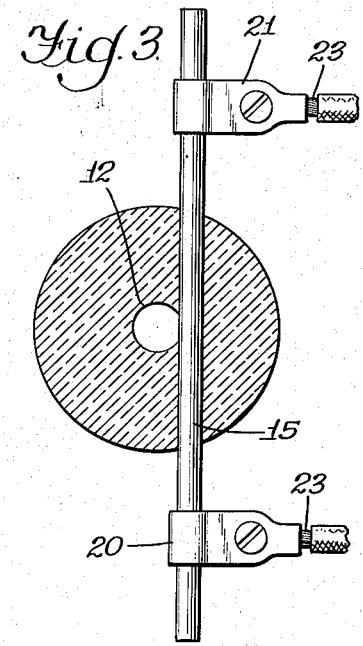
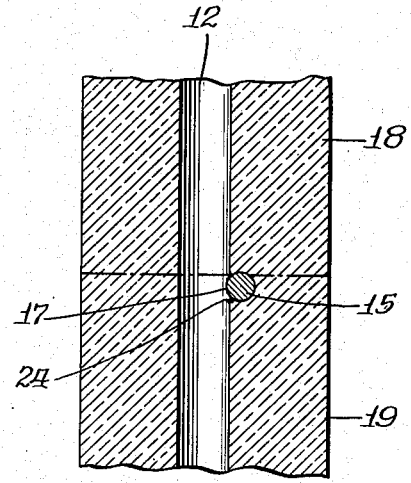
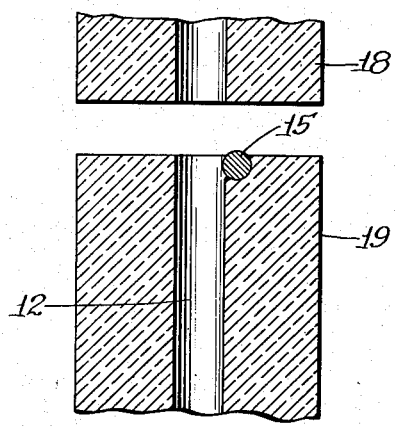
INVENTORS.
William M. Smith
Benjamin F. Freeberg
Alva W. Tharp
By Harvey M. Gillespie Atty.

Patented Nov. 24, 1953

2,660,005

UNITED STATES PATENT OFFICE 2,660,005

METHOD OF MAKING MERCURY COLUMN THERMOSTATS

William M. Smith, Wheaton, and Benjamin F. Freeberg and Alva W. Tharp, Chicago, Ill., assignors to Vapor Heating Corporation, Chicago, Ill., a corporation of Delaware Original application February 17, 1949, Serial No. 76,954. Divided and this application October 16, 1951, Serial No. 251,608

4 Claims. (Cl. 49—81)

This invention relates to the manufacture of liquid column thermostats and has for its principal object the provision of an improved method of embedding one or more contact wires in the glass tube of such thermostat so as to be engaged by said liquid column to complete an electrical circuit.

Heretofore, considerable difficulty has been experienced in sealing contact wires in the glass tubes of liquid column thermostats so as to provide adequate electrical contact with the thermo-responsive liquid column contained therein. These difficulties have been due primarily to the fact that the contact wires, heretofore used, have extended only to the inner wall of the tube. Consequently, the end only of the wire makes contact with the liquid column in the thermostat tube. Therefore, the area of this contact is frequently reduced by the flow of molten glass over the end of the wire during the operation of sealing the wire in the tube.

In order to facilitate positioning of the contact wire in the thermostat tube, according to the old method, the tube is ordinarily severed and the end of the wire is arranged flush with the inner wall of the central bore of the tube. The severed ends of the glass tube are then rejoined together by heating the glass to a plastic state. In such case the displacement of the molten glass around the contact wire during the sealing operation frequently results in partially or wholly covering the end of the wire so as to materially reduce or wholly prevent electrical contact of the wire with the liquid column in the tube. Also, the old method of construction frequently results in so extending the contact wire into the bore of the tube as to objectionably reduce the cross sectional area of the bore.

According to the present method, the glass tube of the thermostat is cut at a desired location for the insertion of the contact wire and the wire, instead of extending only to the surface of the central bore of the tube, extends entirely across the tube on a line which intersects the circumference of the central bore. In this position of the wire its smooth lateral surface, as distinguished from an end surface, will make contact with the liquid column. The smooth lateral surface of the wire, being of larger area than the end area, assists in producing a phenomenon during the manufacture of the thermostat, whereby the liquid column, for example mercury, when heated to a selected temperature corresponding to a desired temperature setting of the thermostat may be readily and accurately separated at the contact wire by flicking the upper end of the tube in a direction to remove the surplus mercury from the central bore. There has been found that in most instances the mercury will accurately separate at such contact wire. Apparently the wire provides a uniform scoring of the mercury column at the restricted area of the bore of the tube and also reduces the surface tension at the wire whereby the inertia, during the arcuate flicking movement of the tube, separates the mercury column at the contact wire.

The opposite ends of the contact wire are connected in an electric circuit so as to heat the wire and melt the surrounding glass sufficiently to permit the wire to be partially embedded in one section of the tube preliminary to the reheating and rejoining of both sections of the tube. The preliminary embedding of the contact wire in the glass of the tube fixes the position of the wire relative to the bore of the tube while the position of the wire can be observed and controlled. Therefore, the application of suitable pressure to the wire is effected to displace the glass adjacent the wire during the initial softening of the glass, the displacement being such as to prevent the glass, during subsequent heating thereof, to a plastic state, from flowing over the inner contact surface of the wire adjacent the bore of the tube.

The method of the present application was originally disclosed in our co-pending application Serial No. 76,954, filed February 17, 1949 (now Patent 2,596,825, dated May 13, 1952), in connection with a mercury column thermostat. The said method, for the purpose of convenience, will be described herein in connection with the manufacture of a mercury column thermostat, but obviously the steps of the method are not necessarily limited to the production of mercury column thermostats.

The invention is illustrated in the accompanying drawing wherein:

Fig. 1 is a view shown partly in elevation and partly in section of a thermostat constructed in accordance with this invention.

Fig. 2 is a view partly in section and partly in elevation illustrating one step in the process of manufacture.

Fig. 3 is a fragmentary sectional view on a greatly enlarged scale taken on line 3—3 of Fig. 2, and showing also suitable electrical connections with the opposite ends of the thermostat contact wire for passing electrical current through the contact wire to heat the glass adjacent the wire.

Fig. 4 is a fragmentary sectional view of a part of Fig. 2 illustrating the position of the contact wire in the tube preliminary to the rejoining of the previously severed sections of the thermostat tube, and Fig. 5 is a view similar to Fig. 4 but illustrating the previously severed sections of the tube fused together.

Referring first to Fig. 1 of the drawing wherein a complete thermostat is shown: The main body of the thermostat tube is designated by the reference numeral 10. It is formed at its lower end with a bulb 11 of predetermined size to provide a storage chamber for the mercury used in the thermostat. The main body 10 is formed with a relatively small central bore 12 which extends from the mercury reservoir 11 to the upper end of the tube and terminates at its upper end in a small bulb 13.

The specific form of thermostat shown herein includes two contact wires designated 14 and 15. The lower contact wire 14 is positioned so that it will be in continuous contact with the mercury column 16. The upper contact 15 is positioned at a predetermined location whereby the mercury column, when expanded by a predetermined temperature, will make contact with the said contact 15. The contact wires 14 and 15 have diameters considerably smaller than the diameter of the bore in the tube and extend entirely through the glass tube of the thermostat, but are arranged at one side of the longitudinal center so that its smooth lateral face will extend into the central bore 12 of the tube a distance approximating one eighth of the diameter of the wire whereby the central point 17 of the wire will be exposed to the interior of the said bore 12 and thereby provide an electrical connection between the contact wires and the mercury column of the thermostat.

The opposite ends of each wires 14 and 15 are suitably soldered or otherwise embedded in metallic rings 14a—15a, the latter of which provide means to which electrical lead wires 14b—15b may be attached.

In order to accurately position the wires 14 and 15 in the glass tube, the tube is severed at the location where the contact wires are to be inserted. For example, when inserting the wire 15 the tube is severed along the line to provide upper and lower sections 18 and 19 (see Figs. 2 and 4). The wire is arranged in a position at one side of the bore so as to form a chord in the inner wall of the bore 12, as indicated in Figs. 2 and 3. The opposite ends of the wire 15 are connected, by means of suitable clamps 20 and 21, to electrodes 22—23 whereby a high induction current is passed through the contact wire, thereby causing it to heat the adjacent glass until it becomes sufficiently plastic to permit the wire, by application of pressure thereto, to be partially embedded in the glass during the initial softening thereof, as indicated in Fig. 4. The displacement of the glass serves to draw the glass, in the region 24, outwardly relative to the axis of the bore so as to maintain a relatively large area 17 of the wire exposed for contact with the mercury column. This preliminary displacement of glass and fusion of the wire in one section of the tube preliminary to rejoining the tubes, maintains the wire in its proper position during the said rejoining of the tubes and minimizes the possibility of the hot plastic glass flowing over the side of the wire which communicates with the bore of the tube. After the tube sections 18 and 19 have been rejoined the metallic ring 15a is applied around the tube and united with opposite ends of the wire 15. The contact wire 14 is positioned in the tube in the same manner as above described in connection with wire 15 and, therefore, need not be specifically described herein.

The contact wires are normally inserted in the tube before the mercury reservoir 11 is formed. In such case both ends of the tube are open and cool air is passed through the bore of the tube to prevent the molten glass from flowing into the bore of the tube. After the contact wires are arranged in their proper position the mercury reservoir is formed and the tube is filled with mercury. The upper end is then sealed by fusion so as to complete the thermostat as shown in Fig. 1.

We claim:

1. An improved method of embedding a contact wire in a glass tube so as to communicate with the central bore of the tube, which consists in severing the tube on a transverse line to provide two sections, arranging the contact wire against an end surface of one section of the tube with an intermediate portion of the wire positioned on a line which cuts the circumference of the bore at one side thereof, passing electrical current through the wire to heat the wire and adjacent material of the tube to fuse them together so as to maintain the wire in proper position relative to the bore of the tube, then heating the adjacent ends of the two sections of the tube and fusing them together, whereby the said wire is embedded in the adjacent faces of said sections.

2. An improved method of embedding a contact wire in a glass tube so as to communicate with the central bore of the tube, which consists in severing the tube on a transverse line to provide two sections, arranging the contact wire against an end surface of one section of the tube and extending entirely across the tube on a line which cuts the circumference of the bore at one side thereof, passing electrical current through the wire to heat the wire and the adjacent material of the tube until the said material assumes a plastic state, applying pressure to the wire to embed it into the softened glass wall of the tube and thereby fix its position in the tube relative to the bore thereof, then heating the adjacent end faces of the two sections of the tube and fusing them together, whereby the said wire is embedded in the adjacent faces of said sections and passing air through the tube to congeal the molten glass at the wall of the central bore.

3. An improved method of embedding a contact wire in a glass tube so as to communicate with the central bore of the tube, which consists in severing the tube on a transverse line to provide two sections, arranging the contact wire against an end surface of one section of the tube and extending entirely across the tube on a line which cuts the circumference of the bore at one side thereof, passing electrical current through the wire to heat the wire and the adjacent material of the tube so as to soften said material while pressure is applied to the wire in a direction to embed it into the softened glass wall of the tube and to displace the glass adjacent the wall of the bore outwardly and thereby expose a large area of the side surface of the wire to the interior of the bore, then heating the adjacent end faces of the two sections of the tube and fusing them together, whereby the said wire is embedded in the adjacent faces of said sections.

4. An improved method of embedding a contact wire in a glass tube so as to communicate with the central bore of the tube, which consists in severing the tube on a transverse line to provide two sections, arranging the contact wire against an end surface of one section of the tube and extending entirely across the tube on a line which cuts the circumference of the bore at one side thereof, heating the wire and the adjacent material of the tube to soften said material while pressure is applied to the ends of the wire to embed its intermediate portion into the glass wall of the tube during the initial softening of the glass, then heating the adjacent end faces of the two sections of the tube and fusing them together, whereby the wire is embedded in the adjacent faces of both sections of the tube and communicates with the central bore.

WILLIAM M. SMITH.
BENJAMIN F. FREEBERG.
ALVA W. THARP.

References Cited in the file of this patent

UNITED STATES PATENTS

| Number | Name | Date |
| --- | --- | --- |
| 1,547,748 | Grogan | July 28, 1925 |
| 2,003,956 | Ronci | June 4, 1935 |
| 2,006,568 | Gustin et al. | July 2, 1935 |
| 2,340,459 | Eitel | Feb. 1, 1944 |
| 2,376,439 | Machlett et al. | May 22, 1945 |

FOREIGN PATENTS

| Number | Country | Date |
| --- | --- | --- |
| 549,277 | Great Britain | Nov. 13, 1942 |